United States Patent [19]

Enders

[11] Patent Number: 5,538,680
[45] Date of Patent: Jul. 23, 1996

[54] METHOD OF MOLDING A POLAR BOSS TO A COMPOSITE PRESSURE VESSEL

[75] Inventor: Mark L Enders, North Ogden, Utah

[73] Assignee: Thiokol Corporation, Ogden, Utah

[21] Appl. No.: 265,406

[22] Filed: Jun. 24, 1994

[51] Int. Cl.⁶ .................................................. B29C 45/14
[52] U.S. Cl. .................. 264/516; 264/512; 264/230; 264/249
[58] Field of Search .................. 264/230, 249, 264/512, 516; 215/31, 30; 220/413, 592, 643, 644, 654, 465, 470, 588, 601

[56] References Cited

U.S. PATENT DOCUMENTS

| | | | |
|---|---|---|---|
| Re. 30,489 | 1/1981 | Abbott | 156/175 |
| 3,057,509 | 10/1962 | Bernd | 220/63 |
| 3,171,563 | 3/1965 | Bernd | 220/3 |
| 3,228,549 | 1/1966 | Courtney | 220/3 |
| 3,367,809 | 2/1968 | Soloff | 156/73 |
| 3,754,319 | 8/1973 | Miori | 29/509 |
| 4,047,667 | 9/1977 | McCullough et al. | 239/265.35 |
| 4,118,928 | 10/1978 | Lyles | 60/255 |
| 4,164,304 | 8/1979 | Roberson | 220/465 |
| 4,360,116 | 11/1982 | Humphrey | 220/3 |
| 4,572,402 | 2/1986 | Gervais et al. | 220/465 |
| 4,589,563 | 5/1986 | Born | 220/3 |
| 4,624,885 | 11/1986 | Mumford et al. | 428/222 |
| 4,649,826 | 3/1987 | Stevens | 102/340 |
| 4,653,663 | 3/1987 | Holtsclaw | 220/465 |
| 4,732,634 | 3/1988 | Hill et al. | 156/161 |
| 4,766,726 | 8/1988 | Tackett et al. | 60/255 |
| 4,778,073 | 10/1988 | Ehs | 220/3 |
| 4,822,671 | 4/1989 | Carper et al. | 428/33 |
| 4,846,911 | 7/1989 | Tackett et al. | 156/173 |
| 4,859,378 | 8/1989 | Wolcott | 264/23 |
| 4,881,998 | 11/1989 | Youngkeit | 156/173 |
| 4,911,795 | 3/1990 | Oliff, Jr. | 204/4 |
| 4,938,824 | 7/1990 | Youngkeit | 156/173 |
| 4,956,971 | 9/1990 | Smith | 60/245 |
| 4,959,110 | 9/1990 | Russell | 156/187 |
| 5,021,270 | 6/1991 | Black, Jr. et al. | 428/34.1 |
| 5,032,016 | 7/1991 | Youngkeit | 350/613 |
| 5,044,154 | 9/1991 | English, Jr. et al. | 60/223 |
| 5,060,470 | 10/1991 | Vanname | 60/253 |
| 5,071,506 | 12/1991 | Nelson et al. | 156/441 |
| 5,098,277 | 3/1992 | Petty | 425/363 |
| 5,174,845 | 12/1992 | Petty | 156/184 |
| 5,206,989 | 5/1993 | Smith et al. | 29/980.01 |
| 5,222,620 | 6/1993 | Lima et al. | 220/404 |
| 5,228,285 | 7/1993 | Van Name et al. | 60/253 |
| 5,243,964 | 9/1993 | Kos | 126/390 |
| 5,253,778 | 10/1993 | Sirosh | 220/590 |
| 5,259,901 | 11/1993 | Davis et al. | 156/154 |
| 5,280,706 | 1/1994 | Yorgason | 60/255 |
| 5,308,427 | 5/1994 | Dvhaime et al. | 156/245 |
| 5,429,845 | 7/1995 | Newhouse et al. | 428/34.1 |

*Primary Examiner*—Jan H. Silbaugh
*Assistant Examiner*—Robin S. Gray
*Attorney, Agent, or Firm*—Ronald L. Lyons; Madson & Metcalf

[57] ABSTRACT

A method for securing a boss to a thermoplastic liner of a pressure vessel are disclosed. A preferred method of forming the vessel includes inserting a thermoplastic projection of the liner into a mounting aperture located in the boss. The projection, which is rigidly attached to the liner, mechanically prevents rotation of the boss about a pressure chamber orifice relative to the liner. The method further includes melting and compressing the thermoplastic projection to conform it to a locking chamber in the mounting aperture. A composite case is then constructed over the thermoplastic projection, the liner, and the boss, using the liner as a mandrel. The thermoplastic liner and projection are integrally formed by blow-molding thermoplastic material into a die without any substantial use of injection-molding. A vessel constructed according to the method is also disclosed.

11 Claims, 7 Drawing Sheets

005,538,680

METHOD OF MOLDING A POLAR BOSS TO A COMPOSITE PRESSURE VESSEL

BACKGROUND

1. The Field of the Invention

The present invention is related to the attachment of a boss to a composite pressure vessel, and more particularly to a method and device for securing a polar boss to a composite pressure vessel without relying on an adhesive placed between the boss and the vessel.

2. Technical Background

Composite pressure vessels are constructed by securing reinforcing fibers in a resin matrix. Composite construction provides vessels which are both lightweight and strong. Accordingly, composite vessels are used in a wide variety of applications to store fluids under pressure. Each composite vessel defines a pressure chamber which contains a pressurized fluid that is moved in a controlled manner in or out of the vessel.

For instance, pressurized oxygen is drawn from such vessels by fire fighters, scuba divers, and other people. Pressurized fluids for extinguishing fires are stored in such vessels in homes, public buildings, and many other locations. Compressed natural gas (CNG) is drawn from pressure vessels to fuel a variety of vehicles. Pressurized oxygen, acetylene, and other flammable gases are stored in such vessels for use by metal workers. Hospitals and dental offices store pressurized anesthetic gases and oxygen in pressure vessels, and research laboratories hold liquid nitrogen and other cryogenic fluids in such vessels.

Because the resin matrix of a composite vessel may crack during use, many composite vessels include a fluid-impermeable liner. Both metallic and non-metallic liners are used, but non-metallic liners are preferred because of their lighter weight. Such liners may be designed not merely to serve as fluid barriers but also to act as a mandrel during fiber winding when the vessel is fabricated using that method.

To permit controlled movement of fluids in or out of the pressure chamber, the vessel is typically configured with a pressure chamber orifice and a boss is fitted about the orifice. The boss is threaded or otherwise shaped for connection to nozzles, valves, gauges, tubes, and similar fixtures which direct and control fluid flow. Accordingly, the boss is formed of metal or another strong, rigid material.

The boss typically includes a cylindrical neck with a longitudinal passage that provides fluid communication between the pressure chamber and the environment outside the vessel. A longitudinal axis is defined within the neck substantially parallel to the passage. A flange is secured to one end of the neck. The flange, which is larger than the pressure chamber orifice, is secured to the liner of the pressure vessel to hold the boss in place. Movement of the flange with respect to the liner is preferably restricted in at least two ways.

First, translation of the boss should be prevented. That is, the boss should not be permitted to move along the central longitudinal axis of the neck such that it falls completely inside the pressure chamber. Nor should the boss be allowed to move in the opposite direction and separate itself from the vessel.

Second, rotation of the boss should be prevented. That is, the boss should not be permitted to rotate with respect to the liner about the central axis of the neck or about the pressure chamber orifice. Thus, when the vessel is held and an attempt is made to thread a fixture into the threaded boss, the boss should not thwart the attempt by rotating with respect to the liner.

The problem therefore arises of how to attach the boss securely to a non-metallic liner to prevent boss translation and rotation. One approach simply relies on the internal pressure in the vessel to attach the boss and liner. Although this pressure may suffice to create a seal between the boss and a non-metallic liner in some vessels, and may prevent boss translation, it generally does not prevent boss rotation.

Another approach positions the boss between two lips of a partially bifurcated liner. Such a liner includes two lip layers disposed about the circumference of the pressure chamber orifice. The boss flange is positioned in an annular recess between the lip layers and is encapsulated by the liner lips. No adhesive is used between the boss and the liner lips. Although this approach limits boss translation, it fails to substantially restrict boss rotation.

A different approach to securing the boss to the liner includes placing a layer of adhesive between the boss and the liner. The adhesive bonds the boss and the liner together, at least initially. Unfortunately, some adhesives deteriorate over time. Thus, the adhesive may not last the entire 15 years needed to span the service life of a CNG container, particularly if hydrothermal stresses or chemical contaminants are introduced into the vessel.

It is also difficult to bond metal bosses to certain thermoplastic materials such as nylons and polyolefins, because petroleum-based thermoplastic materials inherently have a so-called "lubricated" surface. The use of adhesives to bond metal to such materials typically involves elaborate surface preparation and treatment steps to ensure an adequate bond. The repeatability of adequate bonding also becomes operator sensitive and hence problematic in large volume manufacturing.

Moreover, using an adhesive layer complicates vessel manufacturing by adding adhesive application and bonding steps. Because the adhesive is an additional material to be purchased, stored prior to use, and incorporated into the vessel, using adhesive also increases the vessel's cost.

Adhesives are also of limited use in applications which subject the boss and liner to repeated or large torques relative to one another. In such applications the adhesive tends to shear apart. For instance, the adhesive may fail in response to torques produced by repeatedly threading fixtures in and out of the boss. Once the adhesive layer shears apart it is generally impractical to attempt repair, and the pressure vessel loses much of its usefulness.

From the foregoing, it can be seen that it would be an advancement in the art to provide a method and device for attaching a boss to a composite pressure vessel without relying on an adhesive layer positioned between the boss and the vessel.

It would also be an advancement in the art to provide such a method and device which prevent the boss from rotating about the pressure chamber orifice with respect to the vessel liner.

It would be an additional advancement to provide such a method and device which achieve a robust and low-cost attachment of the boss and the liner.

Such a method and device are disclosed and claimed herein.

BRIEF SUMMARY OF THE INVENTION

The present invention is directed to a method and device for securing a boss to a thermoplastic liner of a pressure vessel. The device of the present invention comprises a liner which includes at least one pressure chamber orifice that provides access to a pressure chamber inside the vessel. The boss is configured with a neck having a passage for providing fluid communication between the pressure chamber and the environment outside the vessel. A flange is secured near one end of the neck.

A preferred pressure vessel of the present invention includes a thermoplastic liner which substantially defines a pressure chamber within the vessel. A polar region of the liner has a pressure chamber orifice placed in fluid communication with the pressure chamber. Two thermoplastic studs which are rigid homogeneous extensions of the liner extend along longitudinal stud axes perpendicular to the liner adjacent the pressure chamber orifice. Each stud is preferably circular but may also be ovoid or utilize other cross-sectional geometries transverse to the stud axis.

The vessel also includes a metal boss having a neck and a flange secured to the neck. The flange may be an integral extension of the neck. The neck is aligned with the pressure chamber orifice so that a passage in the neck provides fluid communication between the pressure chamber and the environment outside the vessel.

One surface of the flange has a mounting aperture which is positioned in mating engagement with the stud to restrict movement of the boss relative to the liner. The mounting aperture extends through the flange and has an enlarged locking chamber portion. The stud extends through the entire length of the mounting aperture and substantially conforms in shape to the aperture. Thus, the aperture and the conforming stud provide a mechanical lock which prevents boss rotation and translation relative to the liner. Additional security is provided by a composite case which is disposed about the liner, the stud, and the boss.

The stud is a preferably a unitary, homogeneous projection from the liner. Thus, the stud and the liner are formed of substantially the same thermoplastic material. The stud and the liner are connected by the inherent cohesion of the thermoplastic material. Thus, an adhesive layer, retaining pin, or other supplementary means is not required. Contiguous connecting portions of the stud and the liner each preferably consist essentially of the same thermoplastic material, with no intervening adhesive layer.

According to the presently preferred method, the thermoplastic liner is formed by molding thermoplastic material into a liner having a thermoplastic projection. The thermoplastic material is blow-molded without any substantial use of injection-molding. In one embodiment, a two-piece mold is used to form a thermoplastic liner having two perpendicularly projecting thermoplastic studs. To secure the boss, each stud is inserted into a corresponding mounting aperture in the boss and then melted sufficiently to conform in shape to the aperture's locking chamber, or to form a rivet head outside the aperture.

The presently preferred method includes inserting a thermoplastic projection of the liner into a mounting aperture which is located in the boss. The boss cannot rotate about the pressure chamber orifice relative to the liner because rotation requires movement transverse to the direction of the projection. The projection and mounting aperture together provide a mechanical lock which prevents such movement.

The method further includes melting at least a portion of the thermoplastic projection sufficiently for the projection to more closely conform in shape to the mounting aperture. A portion of the melted projection is compressed against an inner wall of a locking chamber within the mounting aperture. The melting step includes substantially filling the locking chamber with a portion of the thermoplastic projection. The narrower portion of the aperture is thus secured on one side by the enlarged portion of the projection in the locking chamber, and on the others side by the liner from which the projection extends. The end of the thermoplastic projection distal from the liner may be brought substantially flush with one surface of the boss, or the thermoplastic projection may be configured with an enlarged riveting head outside the mounting aperture. Thus, the mounting aperture and the projection together provide a mechanical lock that prevents boss translation.

After the melting and compressing steps, a composite case which covers the melted portion of the thermoplastic projection is constructed by winding resin-impregnated fiber about the liner and boss. The case may also be constructed by tube rolling, i.e., by wrapping sheets of fiber reinforcement about the mandrel, or by other conventional methods. The liner acts as a mandrel while the composite case is constructed. The mechanical and adhesive properties of the composite case acting against the boss and the liner provide an additional lock between the liner and the boss.

The present invention thus provides a robust and low-cost method and device for attaching a boss to a composite pressure vessel without relying on an adhesive layer positioned between the boss and the vessel. The strength and cohesion of the liner, stud, and boss together with the interlocking shapes of the stud and the mounting aperture provide a mechanical lock which prevents boss translation and rotation.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
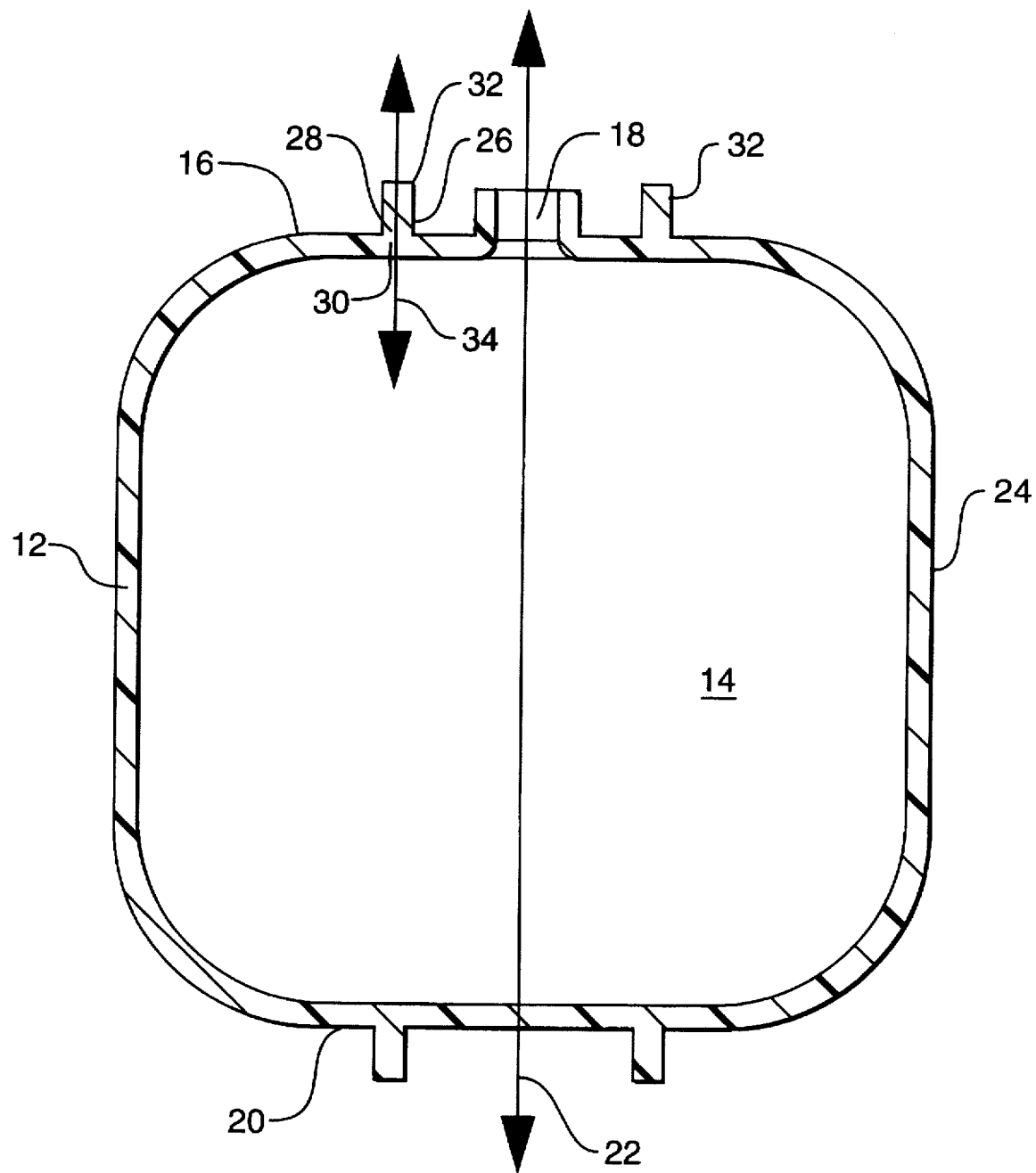
FIG. 1 is a longitudinal cross-section of a thermoplastic liner according to the present invention, illustrating a pair of thermoplastic studs extending perpendicularly from a polar region of the liner adjacent a pressure chamber orifice.

Reference is now made to the figures wherein like parts are referred to by like numerals. The present invention relates to a method and device for securing a boss to a thermoplastic liner of a pressure vessel. A preferred embodiment of a pressure vessel of the present invention comprises a thermoplastic liner 12, illustrated in FIG. 1, which substantially defines a pressure chamber 14 within the vessel. The thermoplastic liner 12 is constructed of conventional thermoplastic material.

As used herein, a "thermoplastic material" is a material which will repeatedly soften when heated above room temperature and will harden when allowed to cool. Thermoplastic materials thus include, without limitation, styrene, acrylics, cellulosics, polyolefins including without limitation polypropylenes and polyethylenes, vinyls, polyamides including without limitation nylons, fluorocarbons, and other thermoplastic resins known to those of skill in the arts of blow-molding, injection-molding, and extrusion processing of thermoplastic materials.

A polar region 16 of the liner 12 is configured with a pressure chamber orifice 18 which is in fluid communication with the pressure chamber 14. Although the liner 12 shown has a single orifice 18, additional orifices may be present. For instance, a second orifice may be placed in the opposite end 20 of the liner 12 to permit the liner 12 to be mounted for rotation upon a shaft (not shown) which passes through the liner 12 along an axis of rotation 22. Thus mounted, the liner 12 may serve as a mandrel for construction of a surrounding composite case 62 (FIG. 5) by conventional fiber winding methods.

Although FIG. 1 shows an orifice 18 located in the polar region 16 of the liner 12, the present invention also contemplates attachment of bosses to orifices located at other positions in the liner 12. For instance, one or more orifices with corresponding bosses may be located in a side 24 of the liner 12 to permit connection of the vessel to nozzles, valves, gauges, tubes, and similar fixtures which direct and control fluid flow.

A thermoplastic projection 26 is rigidly attached to the liner 12. Attachment is preferably accomplished by a connecting portion 28 of the projection 26 which is contiguous to and cohesive with a connecting portion 30 of the liner 12. The connecting portion 28 of the projection 26 is the largest portion of the projection 26 that is contiguous to the liner 12. Likewise, the connecting portion of the liner 12 is the largest portion of the liner 12 that is contiguous to the projection 26. The connecting portions 28 and 30 each consist essentially of the thermoplastic material which is used to form the liner 12. In particular, the connecting portions 28 and 30 contain no additional adhesive. That is, the projection 26 is not attached to the liner by a adhesive layer but is rather held in place by the inherent cohesiveness of the thermoplastic material. The studs 32 are preferably integral parts of the liner 12, with no discontinuity between the studs 32 and the liner 12.

The projection 26 may be shaped as a vane, a ridge, a tooth, a cone, or any of a variety of other shapes. However, in the preferred embodiment illustrated in FIG. 1, the projection 26 takes the shape of a cylindrical stud 32 which extends along a longitudinal stud axis 34 perpendicular to the liner 12. The stud 32 is substantially parallel to the axis 22. Although the stud 32 shown is substantially circular in a cross-section transverse to the stud axis 34, the cylindrical stud 32 need not be circular in cross-section. For instance, embodiments which require greater stud strength may employ a stud which is substantially ovoid in cross-section. Other cross-sectional geometries may also be effectively employed; geometries compatible with blow-molding are preferred.

Figure 2:
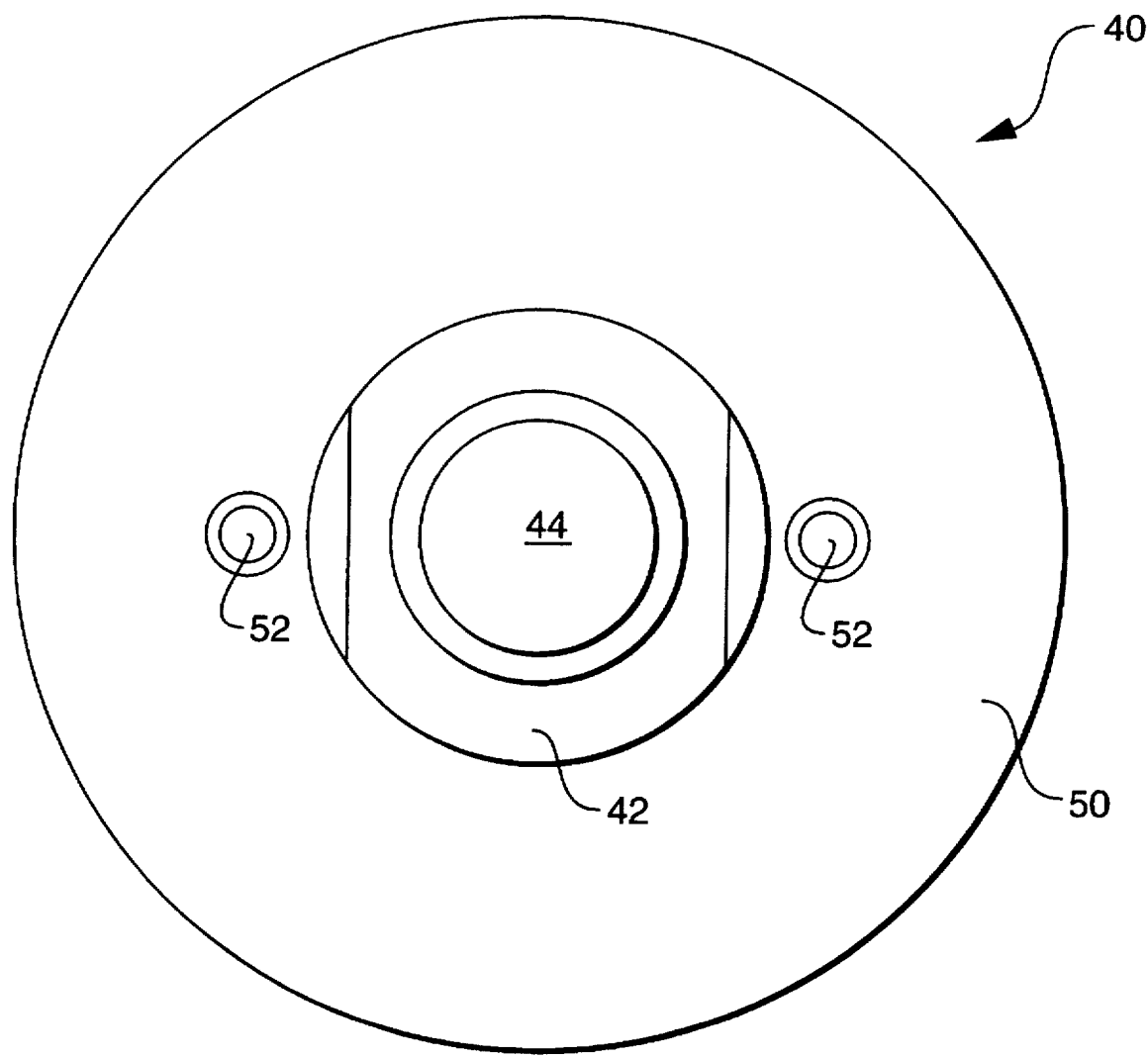
FIG. 2 is a top view of a polar boss suitable for attachment to the liner of FIG. 1.
Figure 3:
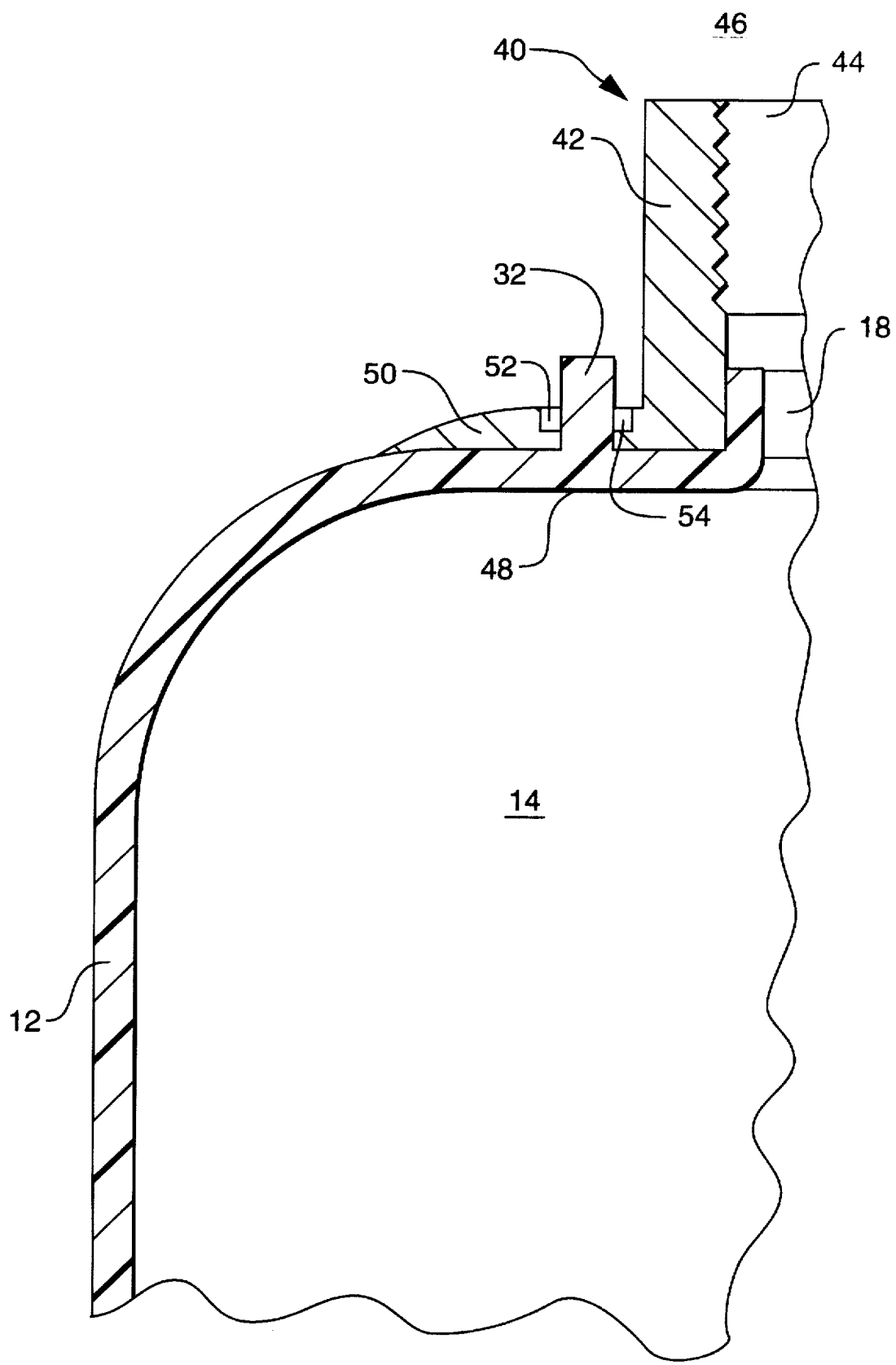
FIG. 3 is a longitudinal cross-section of a portion of the liner and the polar boss showing the stud immediately after its insertion in a mounting aperture of the boss.

As shown in FIGS. 2 and 3, the pressure vessel of the present invention also includes a boss 40. The boss 40 is typically formed of metal in order to resist the stresses of connecting fixtures to the vessel. The boss 40 also reinforces the vessel around the pressure chamber orifice 18. The present invention also contemplates the use of bosses formed of plastic, hard rubber, resin, or other relatively strong, rigid materials.

The boss 40 has a neck 42 which contains a passage 44. The boss 40 is positioned with the passage 44 aligned with the pressure chamber orifice 18 to permit fluid communication between the pressure chamber 14 and the environment 46 outside the vessel. Although a boss 40 having a single central passage 44 is illustrated in this preferred embodiment, other embodiments of the vessel may employ bosses which have one or more offset passages. Other bosses, which are intended for use as plugs and therefore contain no passage, may also be utilized as the particular application requires.

As shown in FIGS. 2 and 3, the boss 40 includes a flange 50 which extends outwardly from the neck 42 and extends annularly about the passage 44. The flange 50 has at least one mounting aperture 52 which is positioned in mating engagement with the corresponding stud 32 to restrict rotation of the boss 40 relative to the liner 12. In this preferred embodiment, two mounting apertures 52 are configured in the flange 50, as illustrated in FIG. 2.

The studs 32 are preferably circular in cross-section. The mounting aperture 52 is also preferably configured with a circular cross-section, as shown in FIG. 2. Of course, the geometry of the mounting aperture 52 should be compatible with that of the stud 32. Thus, embodiments employing an ovoid stud would also preferably employ an ovoid mounting aperture.

In this preferred embodiment, the flange 50 is shown positioned outside the pressure chamber 14. Alternatively, the stud 32 may project from an inner wall 48 of the liner with the flange 50 positioned inside the pressure chamber 14.

Each stud 32 is positioned in mating engagement with a corresponding mounting aperture 52 in the flange 50 of the boss 40. As shown in FIGS. 1 and 2, a presently preferred embodiment of the boss 40 has two mounting apertures 52 which mate with two thermoplastic studs 32. The utilization of two studs provides greater resistance to boss rotation than if only one stud is used. Moreover, two diametrically opposed studs 32 can be formed together with the liner 12 by blow-molding thermoplastic material into a two-piece die, whereas forming three or more studs spaced evenly about the chamber orifice 18 requires either additional die pieces or additional steps such as injection-molding.

In the embodiment illustrated, each mounting aperture 52 extends completely through the flange 50. In other embodiments of the vessel the flange is equipped with mounting cavities that are depressions rather than apertures. Such mounting cavities are shaped and dimensioned for mating engagement with corresponding vanes, teeth, or other thermoplastic projections from the liner in order to prevent boss rotation.

Although FIG. 3 shows a stud 32 which extends along and then beyond the entire length of the mounting aperture 52 both before and after melting, in other embodiments the stud extends for less than the entire length of the mounting aperture either before melting or both before and after melting. For instance, in one alternative embodiment the melted stud is covered by a cap (not shown) after the boss is attached to the liner. In another embodiment the melted stud is countersunk to avoid a gap between the flange and the composite case which is formed over the stud.

Figure 4:
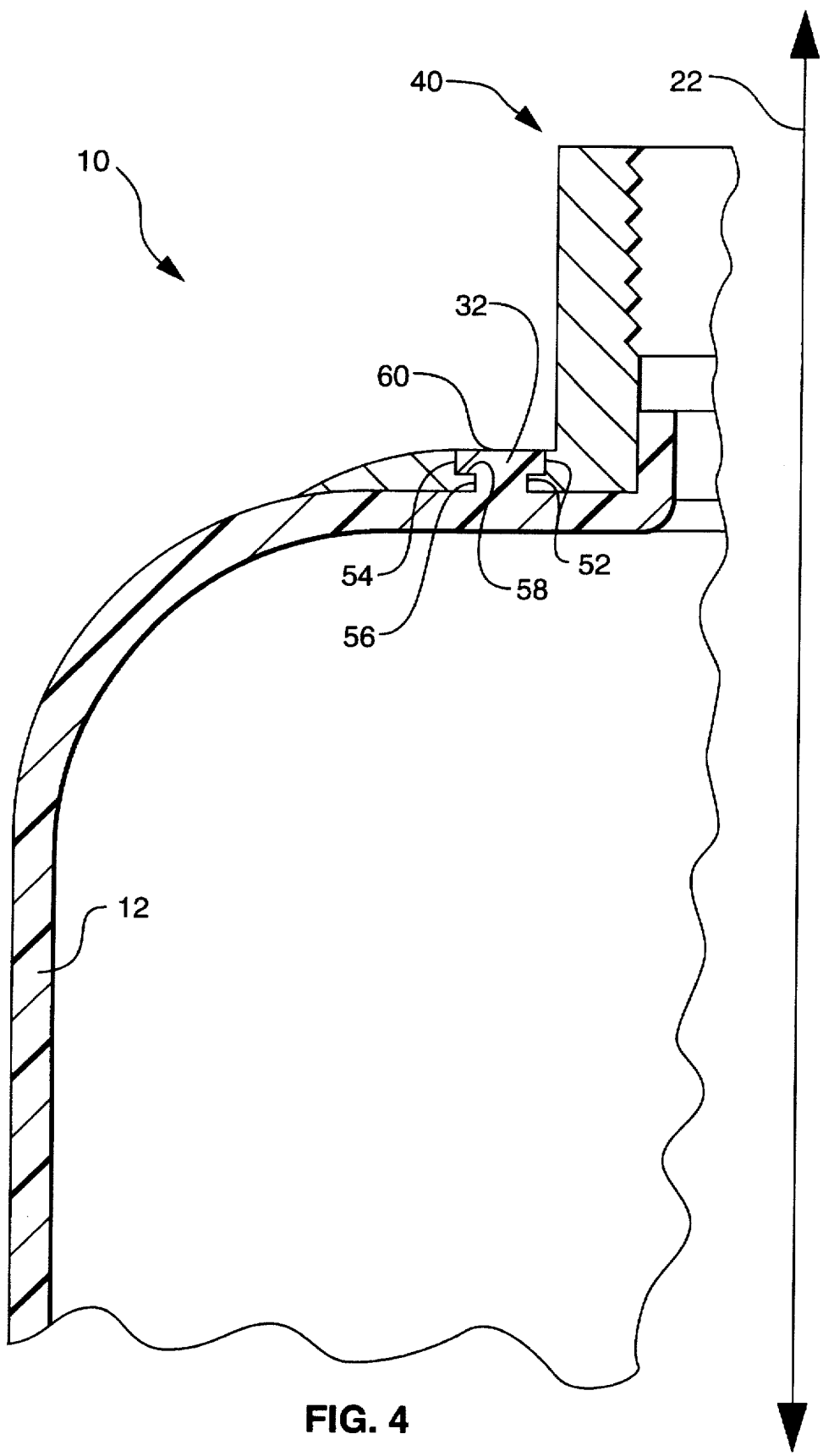
FIG. 4 illustrates the liner, stud, and boss shown in FIG. 3 after the stud has been partially melted and substantially conformed to the mounting aperture.

As shown in FIG. 4, the presently preferred mounting aperture 52 has an enlarged locking chamber portion 54 and a narrower portion 56. The locking chamber 54 shown is a larger circular bore formed next to a smaller circular bore 56 such that a step 58 separates the two portions 54 and 56 of the aperture 52. In another embodiment, the mounting aperture takes the shape of a truncated inverted cone, thereby eliminating any step which delimits the transition from the locking chamber to the narrower portion 56 of the aperture. As will be appreciated by those of skill in the art, the locking chamber may assume any of a variety of shapes provided that it is larger than, and separated from the liner by, the narrower portion of the mounting aperture. The locking chamber must be contiguous to the narrower portion but need not be contiguous to the environment outside the vessel.

FIG. 4 also illustrates the stud 32 of FIG. 3 after it has been substantially conformed to the shape of the mounting aperture 52. In particular, an enlarged head 60 of the conformed stud 32 substantially fills the locking chamber 54. Because the stud 32 is a projection of the liner 12, the flange 50 is thus secured between the head 60 of the stud 32 on one side and the liner 12 on the other side.

Thus, the stud 32 and the mounting aperture 52 together provide a mechanical lock which prevents translation of the boss 40 relative to the liner 12 in the direction generally parallel to the axis 22. This lock is preferably of sufficient strength to withstand the inflatable mandrel pressure within the pressure chamber 14, to provide a rigid mandrel for applying composite materials. Typical pressures within the pressure chamber 14 for an inflatable mandrel may be a pressure in the range up to about 120 p.s.i.

Furthermore, the stud 32 and the mounting aperture 52 provide a mechanical lock which prevents rotation of the boss 40 about the axis 22 relative to the liner 12. Such rotation can only be accomplished by shearing the stud 32 from the liner 12 or by fracturing the boss 40 and removing the mounting aperture 52 from about the stud 32. However, the stud 32 is rigidly attached to the liner 12 by the inherent cohesion and strength of the thermoplastic material. Moreover, the stud 32 may be sized and supplemented by additional studs as needed to resist shearing. To prevent the boss 40 from fracturing, the boss 40 is constructed of metal or a similarly strong material. In short, the present invention provides a vessel having a boss securely attached to a thermoplastic liner without the use of an adhesive layer between the boss and the liner.

Figure 7:
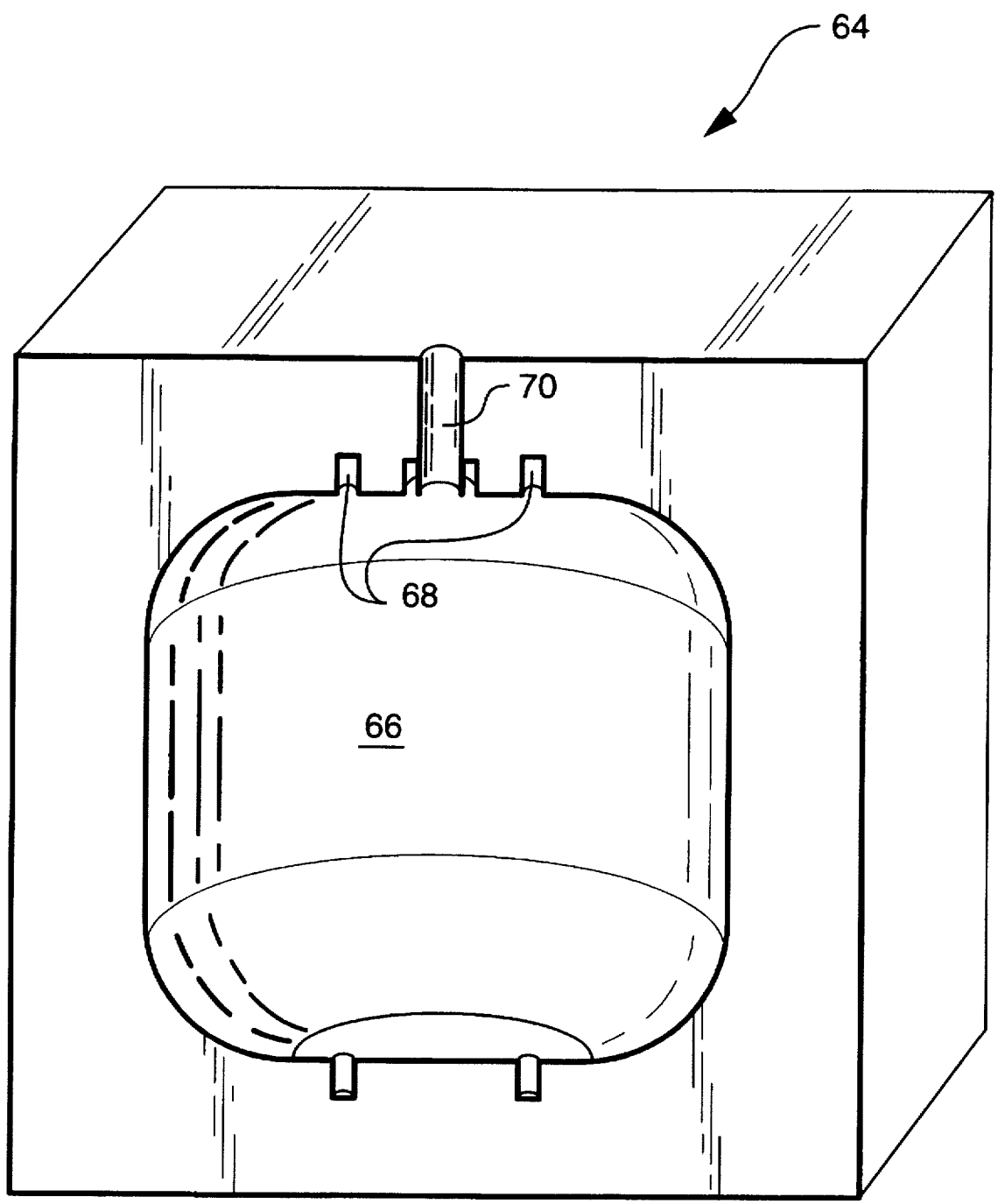
FIG. 7 is an isometric view illustrating one half of a symmetric die used in forming the liner and stud by a blow-molding process.

The present invention also provides a method for forming such pressure vessels. With reference to FIGS. 1 and 7, one presently preferred method begins by forming the thermoplastic liner 12 and studs 32. The thermoplastic liner 12 is preferably formed by blow-molding thermoplastic material into a die 64; for clarity, only half of the symmetric die 64 is illustrated. The die 64 is configured with a substantially liner-shaped cavity 66 and with projection cavities 68. The projection cavities 68, which are contiguous to the liner cavity 66, correspond in shape to the studs 32. The die 64 also has an opening 70 through which a conventional parison (not shown) may be inserted into the liner cavity 66.

The inserted parison is used in a manner known to those of skill in the molding arts to introduce pliable thermoplastic material into the liner cavity 66. The parison is then used to contain and apply gas pressure to force the thermoplastic material against the walls of the cavity 66 and into the projection cavities 68, that is, to blow-mold the liner 12 and the studs 32 (FIG. 1). Thus, the studs 32 are formed integral and unitary with the liner 12 in one blow-molding step. Importantly, the use of injection-molding, which is complicated and expensive, may be avoided.

According to the method of the present invention, the boss is attached to the liner by initially inserting a thermoplastic projection which is rigidly attached to a thermoplastic liner into a mounting aperture which is located in the boss. As illustrated in FIGS. 1 and 3, it is presently preferred to utilize two studs 32 as thermoplastic projections. After insertion, the studs 32 project perpendicularly from the thermoplastic liner 12 into the mounting aperture 52 to prevent rotation of the boss 40 about the orifice 18. An inserted projection may also be a tooth, a vane, or another projection having a portion substantially perpendicular to the liner 12. Embodiments of the present method also comprise inserting two or more thermoplastic projections which are rigidly attached to the thermoplastic liner into a corresponding plurality of mounting apertures located in the boss.

The present method further includes melting at least a portion of the thermoplastic projection sufficiently for the projection to more closely conform in shape to the mounting aperture. Melting may be accomplished by any suitable known thermoplastic processing method, such as ultrasonic, induction, friction, or conduction heating, or by chemical melting with a sufficiently strong solvent.

FIG. 4 illustrates the result of melting the head portion of the thermoplastic stud 32 sufficiently for the stud 32 to conform to the mounting aperture 52. In particular, a portion of the conformed stud 32 substantially fills the locking chamber 54. Locking may also be achieved by only partially filling the locking chamber, provided that a portion of the melted stud is too large to pass through the narrower portion 56 of the mounting aperture.

To assist in conforming the stud 32 to the mounting aperture 52 during the melting process, the stud 32, when in a flowable state, may be compressed by conventional means against the inner wall of the mounting aperture 52 before the stud 32 cools and hardens. The narrower portion 56 of the aperture 52 is thus secured on one side by the enlarged head of the stud 32 in the locking chamber 54, and on the other side by the liner 12 from which the stud 32 projects.

Although FIG. 4 illustrates a stud 32 whose head 60 is substantially flush with the surface of the boss 40 distal from the liner 12, other embodiments are also contemplated. For instance, the head 60 may be recessed or countersunk to prevent creation of a gap between the subsequently added composite case 62 (FIG. 5) and the flange 50, or to permit coverage of the thermoplastic head with an insulating or cosmetic cap (not shown).

Figure 6:
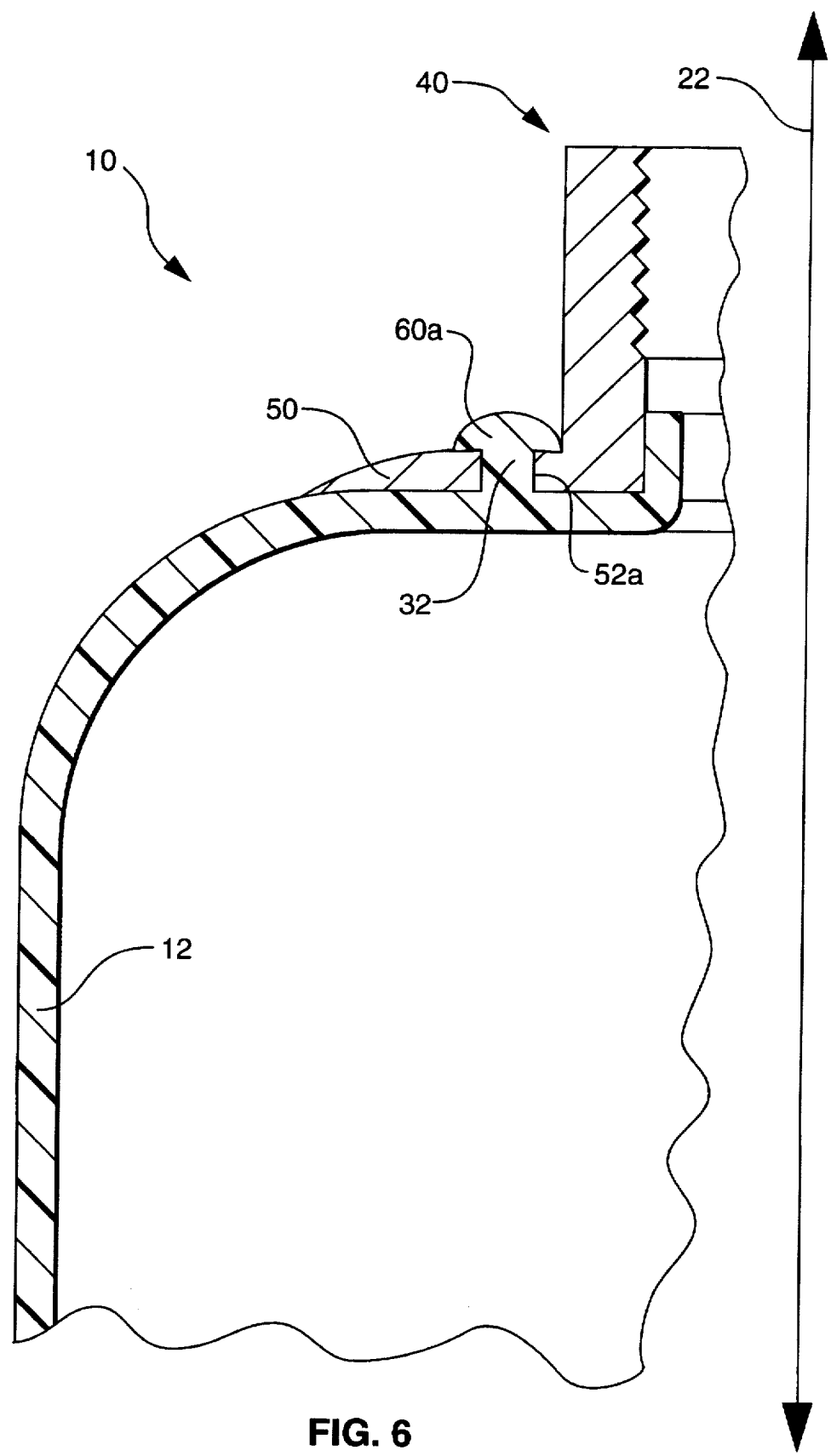
FIG. 6 is a longitudinal cross-section illustrating a portion of the liner and alternative embodiments of the stud and the mounting aperture.

Alternatively, the vessel 10 may be configured as shown in FIG. 6 with a mounting aperture 52a of substantially uniform diameter. The aperture 52a is more readily manufactured than the aperture 52 of FIG. 4 because the step of forming the locking chamber 54 is not required. An enlarged rivet head 60a is formed on the side of the flange 50 distal from the liner 12 by partially melting the stud 32. The rivet head 60a is larger than the mounting aperture 52a, and hence the boss 40 is mechanically prevented from translating along the axis 22.

Figure 5:
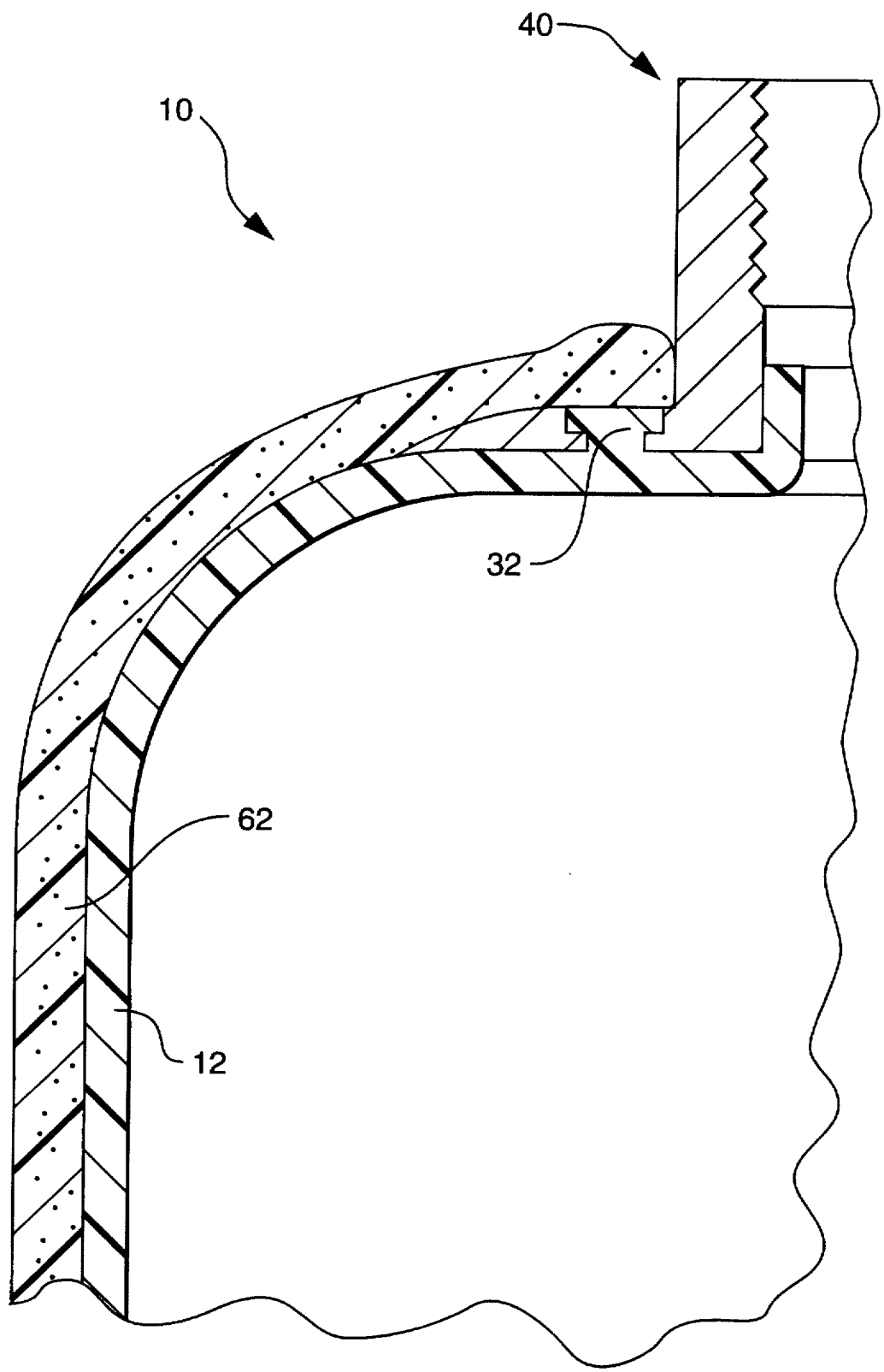
FIG. 5 illustrates the liner, stud, and boss shown in FIG. 4 after a composite case has been wrapped about them by fiber winding.

The composite case 62 illustrated in FIG. 5 is constructed according to known methods, such as by wrapping sheets of fiber, braiding, hand taping, or by winding resin-impregnated fiber about the liner and boss. The case 62 preferably covers the melted portion of the thermoplastic projection 32. The liner 12 may act as a mandrel while the composite case 12 is constructed. If the liner 12 lacks sufficient rigidity to serve as a mandrel, the liner 12 may be inflated by pressurizing the chamber 14 prior to fiber winding. The mechanical and adhesive properties of the composite case 62 acting against the boss 40 and the liner 12 provide an additional lock between the liner 12 and the boss 62.

The present invention thus provides a robust, low-cost method and device for attaching a boss to a composite pressure vessel without relying on an adhesive layer positioned between the boss and the vessel. Instead, the strength and cohesion of the liner, stud, and boss, together with the interlocking shapes of the stud and the mounting aperture, provide a mechanical lock which prevents boss translation and rotation. The method and device achieve a robust attachment of the boss and the liner because the number of studs, their relative positions, and the size of each stud can be tailored to provide the required torsional resistance. The attachment is also low-cost, because the costs associated with adhesive layers and injection-molding are eliminated.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for securing a boss to a thermoplastic liner to form an inflatable mandrel for use in constructing a pressure vessel, comprising the steps of:

obtaining a thermoplastic liner configured with a pressure chamber orifice and having a thermoplastic projection rigidly attached to the thermoplastic liner which extends from the thermoplastic liner adjacent the pressure chamber orifice;

obtaining a boss having a neck with a flange secured to the neck, the flange having a surface with a mounting aperture;

aligning the neck of the boss with the pressure chamber orifice in the thermoplastic liner;

inserting the thermoplastic projection into the mounting aperture; and melting at least a portion of the thermoplastic projection sufficiently for the thermoplastic projection to more closely conform in shape to the mounting aperture and thereby secure said boss to said thermoplastic liner.

2. The method of claim 1, wherein the mounting aperture comprises an enlarged locking chamber and said melting step comprises substantially filling the locking chamber with at least said portion of the thermoplastic projection.

3. The method of claim 2, wherein said melting step comprises making an end of the thermoplastic projection substantially flush with a surface of the boss distal from the thermoplastic liner.

4. The method of claim 1, wherein said melting step comprises configuring the thermoplastic projection with a head larger than the mounting aperture on a surface of the boss distal from the thermoplastic liner.

5. The method of claim 1, wherein the step of obtaining a thermoplastic liner comprises molding thermoplastic material to form said thermoplastic liner having said thermoplastic projection.

6. The method of claim 5, wherein said molding step comprises blow-molding the thermoplastic material.

7. The method of claim 5, wherein said molding step comprises molding said thermoplastic material to form said thermoplastic liner having a perpendicularly projecting thermoplastic projection.

8. The method of claim 7, wherein said molding step comprises forming said thermoplastic projection having a substantially circular cross-section.

9. The method of claim 7, wherein said molding step comprises forming said thermoplastic projection having a substantially ovoid cross-section.

10. The method of claim 1, wherein said melting step is followed by the step of compressing at least said portion of the thermoplastic projection against an inner wall which partially defines the mounting aperture.

11. The method of claim 1, wherein said inserting step comprises inserting a pair of thermoplastic projections which are rigidly attached to the thermoplastic liner into a corresponding pair of mounting apertures which are located in the boss, and wherein said melting step comprises melting at least a portion of said pair of thermoplastic projections sufficiently for the projections to more closely conform in shape to the corresponding pair of mounting apertures.

* * * * *